United States Patent
Engler et al.

(10) Patent No.: US 11,592,552 B2
(45) Date of Patent: Feb. 28, 2023

(54) SENSOR AND METHOD FOR DETECTING AN OBJECT

(71) Applicant: SICK AG, Waldkirch (DE)

(72) Inventors: Michael Engler, Waldkirch (DE); Joachim Krämer, Waldkirch (DE)

(73) Assignee: SICK AG, Waldkirch (DE)

( * ) Notice: Subject to any disclaimer, the term of this patent is extended or adjusted under 35 U.S.C. 154(b) by 557 days.

(21) Appl. No.: 16/704,695

(22) Filed: Dec. 5, 2019

(65) Prior Publication Data
US 2020/0200901 A1 Jun. 25, 2020

(30) Foreign Application Priority Data

Dec. 21, 2018 (DE) .......................... 102018133281.5

(51) Int. Cl.
*G01S 17/04* (2020.01)
*G01S 7/481* (2006.01)
*G01S 7/497* (2006.01)
*G01S 17/10* (2020.01)

(52) U.S. Cl.
CPC ............ *G01S 17/04* (2020.01); *G01S 7/4817* (2013.01); *G01S 7/497* (2013.01); *G01S 17/10* (2013.01)

(58) Field of Classification Search
CPC ...... G01S 7/4876; G01S 17/93; G01S 7/4815; G01S 17/86; G01S 7/4913; G01S 17/894; G01S 17/89; G01S 7/484; G06T 2200/04; G06T 2207/10028
See application file for complete search history.

(56) References Cited

U.S. PATENT DOCUMENTS

2013/0187032 A1* 7/2013 Kawabata ............... G01S 17/04
                                                          250/214 SW
2013/0229297 A1    9/2013 Mukai et al.

FOREIGN PATENT DOCUMENTS

| DE | 102016113131 A1 | 1/2018 |
|----|---|---|
| DE | 102017202957 A1 | 8/2018 |
| EP | 1795913 A2 | 6/2007 |
| EP | 2378309 A1 | 10/2011 |
| EP | 2469296 B1 | 10/2012 |
| EP | 2541273 A1 | 1/2013 |
| EP | 3091369 A1 | 11/2016 |
| EP | 3124996 A1 | 2/2017 |
| EP | 3327462 A1 | 5/2018 |

(Continued)

*Primary Examiner* — Tony Ko
(74) *Attorney, Agent, or Firm* — Nath, Goldberg & Meyer; Jerald L. Meyer

(57) ABSTRACT

An optoelectronic sensor, in particular a laser scanner, for detecting an object in a monitored zone is provided having a light transmitter for transmitting a light beam into the monitored zone; a light receiver for generating a received signal from the light beam remitted by the object; a moving deflection unit for a periodic deflection of the light beam to scan the monitored zone in the course of the movement; and having a control and evaluation unit that is configured to determine the time of flight between the transmission and reception of the light beam and to determine the distance from the object therefrom, wherein the sensor has a correction of the signal dynamics, i.e. of the relative reception power in dependence on the distance of the scanned object, The control and evaluation unit is here configured to correct the signal dynamics by adapting the sensitivity of the sensor.

17 Claims, 3 Drawing Sheets

(56) References Cited

FOREIGN PATENT DOCUMENTS

Figure 1:
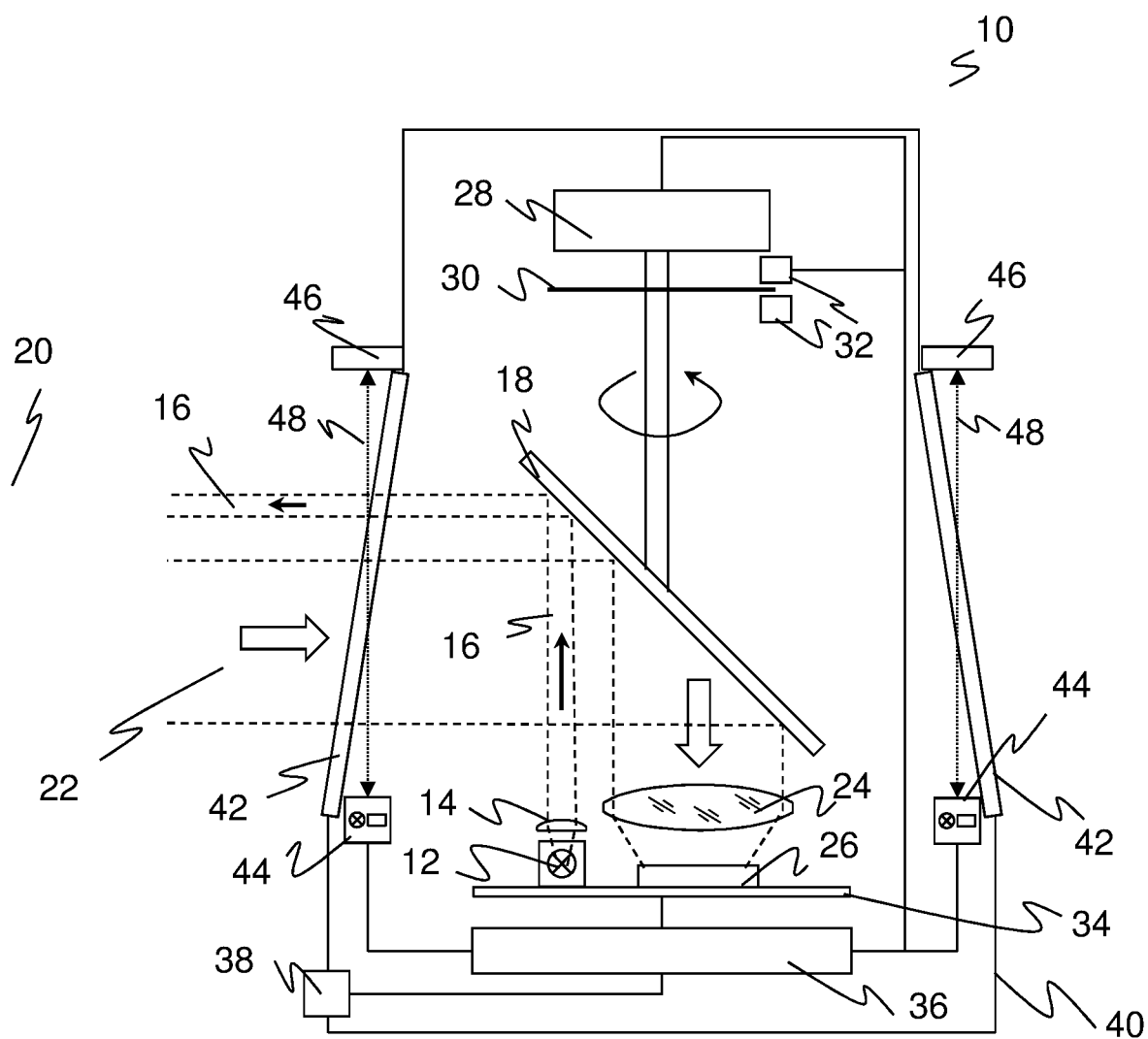

EP 3367135 A1 8/2018
WO 2016/101973 A1 6/2016

* cited by examiner

SENSOR AND METHOD FOR DETECTING AN OBJECT

The invention relates to an optoelectronic sensor, in particular to a laser scanner, and to a method for detecting an object in a monitored zone in accordance with the preambles of the respective independent claims.

In a laser scanner, a light beam generated by a laser periodically sweeps over a monitored zone with the help of a deflection unit. The light is remitted at objects in the monitored zone and is evaluated in the laser scanner. A conclusion is drawn on the angular location of the object from the angular position of the deflection unit and additionally on the distance of the object from the laser scanner from the time of flight while using the speed of light. Two general principles are known to determine the time of flight for conventional laser scanners. In phase-based processes, the continuous transmitted light is modulated and the phase shift of the received light with respect to the transmitted light is evaluated. In pulse-based processes or pulse time of flight processes, the transmitter works in single pulse operation at comparatively high pulse energies and the laser scanner measures object distances with reference to the time of flight between the transmission and reception of a single light pulse. In a pulse averaging process known, for example, from EP 2 469 296 B1, a plurality of individual pulses are transmitted and the received pulses are statistically evaluated for a measurement.

The location of an object in the monitored zone is detected in two-dimensional polar coordinates using the angular data and the distance data. The positions of objects can thus be determined or their contour can be determined. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

Laser scanners are not only used for general measurement work, but also in safety engineering or in operator protection for monitoring a hazard source, such as a hazardous machine. Such a safety laser scanner is known from DE 43 40 756 A1. In this process, a protected field is monitored which may not be entered by operators during the operation of the machine. If the safety laser scanner recognizes an unauthorized protected field intrusion, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the safeguarding in good time and thus to increase the availability of the plant. As a rule, safety laser scanners work in a pulse based manner.

Safety laser scanners have to work particularly reliably and must therefore satisfy high safety demands, for example the EN13849 standard for safety of machinery and the machinery standard EN61496 for electrosensitive protective equipment (ESPE). To satisfy these safety standards, a series of measures have to be taken such as a secure electronic evaluation by redundant, diverse electronics, functional monitoring or monitoring of the contamination of optical components. The latter in particular relates to a front screen of the safety laser scanner that is conventionally tested with respect to its transmission capability by detectors in the manner of light barriers distributed over the periphery. The demands on self-diagnosis are differently high in dependence on the hazard potential, which is expressed, for example, by so-called performance levels.

A safety laser scanner should also detect objects having very low remission, and indeed over its total range. This requires a high sensitivity, with the minimum sensitivity being able to be defined via a minimal signal strength from which onward an object is considered as potentially safety-critical and for which reason a safeguarding takes place on its detection in a protected field. The high sensitivity is reflected in the availability: The more sensitive a safety laser scanner is, the more easily and more frequently it can be disrupted by external influences such as dust, insects, or the like that then trigger unwanted shutdowns. This is to be avoided in practice where possible due to standstill times of the monitored plant that are unnecessary per se. Conventionally, reserves are also kept back to compensate for drifting due to component aging, for instance of the transmission laser, or to compensate for reduced received signals, for instance due to a dirty front screen. However, as long as such drifting has not yet appeared at all, this increases the sensitivity per se in an unnecessary manner and increases the availability problems.

The reception power for an object having specific remission properties is not a constant, but rather has a distance dependence. This is described by the so-called signal dynamics that indicate the relative reception power in dependence on the distance of the scanned object with otherwise constant object properties.

The signal dynamics can be approximately understood as a superposition of two contrary effects. Laser scanners typically use a transmission lens that collimates the transmitted light and a reception lens that collects as much light as possible. The signal strength now decreases quadratically with the distance, on the one hand. The weakest received signal is therefore typically received at a maximum range and the signal dynamics, that represent a relative value, there are, for example, set to a value of one. On the other hand, the laser light spot is only imaged ideally on the light receiver from infinity. At shorter distances, the light spot increasingly moves out of the light receiver when the transmission lens and the reception lens are arranged biaxially next to one another or radiates over the light receiver in a coaxial arrangement. In both cases, the received light is only partially transformed into a received signal toward the near zone. The signal dynamics that adopt the smallest value at the maximum range consequently first become larger toward shorter distances due to the quadratically increasing signal strength, but then fall again in the near zone because only a small portion of the light is still incident on the light receiver. A maximum of the signal dynamics is therefore typically produced approximately at a third to a half of the maximum range.

It is attempted to flatten the signal dynamics by the optics design in the prior art. The optics is typically a multi-zone lens that provides a respective separate lens zone for the near and far zones and possibly for intermediate distance zones. EP 2 378 309 A1 shows an alternative approach with a multi-zone mirror. Due to the plurality of zones, the signal dynamics can also adopt more complicated designs than a simple maximum that drops at both sides. Multi-zone optics are complex and/or expensive and are additionally only a partial solution. Flat signal dynamics would be ideal that have the value of one at all points since the signal dynamics would thus be effectively shut off. In practice, the optically corrected signal dynamics still also reach a maximum value of at least four.

The sensitivity setting of conventional laser scanners does not take any account of the signal dynamics if they cannot be optically corrected, but is rather adapted to the worst case scenario, namely an object at a distance corresponding to the maximum range. This has the disadvantage that the laser scanner becomes unnecessarily sensitive at another point, above all in the region of the maximum signal dynamics, i.e. at intermediate distances where in relative terms the most energy comes back from the object.

DE 10 2016 113 131 A1 discloses a distance sensor or laser scanner that dynamically adapts its sensitivity with reference to a distance to be expected or to a signal-to-noise ratio. However, the signal dynamics are not taken into account here, but rather only the quadratic energy reduction with the distance. The sensitivity accordingly increases toward greater distances, which does not satisfy the actual situation and which neither ensures safety nor remedies the availability problem.

It is therefore the object of the invention to provide a more robust object detection for a sensor of the category.

This object is satisfied by a sensor, in particular by a laser scanner, and by a method for detecting an object in a monitored zone in accordance with the respective independent claim. The sensor transmits a light signal and receives the light signal remitted from a scanned object again as a signal echo. The monitored zone is periodically scanned with the aid of a moving deflection unit, that is, for example, a rotating optics head having a light transmitter and a light receiver or a rotating mirror. A control and evaluation unit determines the time of flight and determines the distance from the scanned object therefrom. Measurement is preferably on a pulse basis, with a transmission pulse being transmitted by the light beam for this purpose and a corresponding reception pulse being generated from the remitted light beam.

A correction of the signal dynamics takes place in this process. The signal dynamics were explained in the introduction and describe the effect that one and the same measured object in particular generates a different reception level at different distances under otherwise unchanged conditions with otherwise constant sensor settings and environmental influences. One possible definition of the signal dynamics is the relative reception power in dependence on the distance of the respectively scanned and detected object. The correction of the signal dynamics takes place conventionally via the optics.

The invention starts from the basic idea of correcting the signal dynamics by adaptation of the sensitivity. The conventional optical corrections such as multi-zone lenses and the like are replaced with an electronic correction or control and/or evaluation. It is alternatively also conceivable to retain an optical correction and to complement it, that is to further correct the signal dynamics remaining after an optical correction by adapting the sensitivity.

The invention has the advantage that a particularly simple and exact correction of the signal dynamics is achieved. The signal dynamics are leveled in an electronic manner. Solely software measures are sufficient for this depending on the embodiment. The complex and/or expensive optical correction of the signal dynamics is replaced or is at least complemented such that lower demands are made thereon or better results are achieved. It is prevented that the sensor reacts unnecessarily sensitively for some distance ranges. An operation is thus possible that is much more robust overall and that substantially reduces disruptive effects, for instance due to particles in the air and on the front screen. The availability thus increases without thereby impairing reliability.

The control and evaluation unit is preferably configured to detect the object by an evaluation of the received signal with a threshold value, with the threshold value being adapted in a distance-dependent manner using the signal dynamics. This can be a real threshold operation with one or more thresholds to localize a received pulse, either by an analog threshold detector or in a digitized received signal, but can also be threshold criteria with which a digitized received signal can be evaluated. Such a threshold is conventionally constant and is adapted to the maximum range due to the sensitivity that is minimal there. In accordance with this embodiment in accordance with the invention, the threshold value becomes dependent on the distance due to the adaptation to the signal dynamics. In other words, detection thresholds are autonomously adapted to the signal dynamics.

The control and evaluation unit is preferably configured to digitize the received signal and to correct it using the signal dynamics. At least one comparator or an A/D converter is provided for the digitizing, for example. The respective scanning values are corrected in dependence on the distance using the signal dynamics. Every scanning value corresponds to a time of flight and thus to a distance so that the respective relevant range can be associated with the signal dynamics. The influence of the signal dynamics for the further evaluation is thus compensated.

The control and evaluation unit is preferably configured to carry out the adaptation of the sensitivity by adaptations of the evaluation. In this embodiment, the adaptation takes place in the evaluation, preferably after digitizing the received signal. This is then a software solution that can be implemented inexpensively, with this being able to be understood in a wide sense and also comprising implementations on digital modules such as an FPGA (field programmable gate array) or an ASIC (application specific integrated circuit).

The control and evaluation unit is preferably configured to adapt components in the reception path of the light receiver for the adaptation of the sensitivity between two measurements and/or within one measurement. The correction therefore already takes place directly in the reception path and the components there are preferably still analog even if the later evaluation is digital. An adaptation between two measurements is comparatively slow and is based on prior knowledge from fixed assumptions, on a configuration, or on an early measurement. A fast adaptation is, however, also conceivable within one measurement on the extremely short time scales of the time of flight. The respective elapsed time since the transmission of a light pulse corresponds to the time of flight up to an object at a specific distance. Correction can therefore be made with respect to this distance using the signal dynamics.

On an adaptation between two measurements it is possible in an alternative or complementary manner to an adaption in the reception path also to make a correction in the transmission path in that the optical starting power of the light transmitter is adjusted. In the case of an increase, the thresholds of eye protection or the laser protection class must be observed.

The control and evaluation unit is preferably configured to adapt the sensitivity of the light receiver, of an amplifier arranged downstream of the light receiver and/or of a threshold detector arranged downstream of the light receiver. They are components of the reception path that are suitable for the adaptation. The sensitivity of the light receiver itself is changed, for example via the voltage applied to an APD (avalanche photodiode) or to a SPAD (single photon avalanche diode). In addition, a gain factor of an amplifier that is connected downstream of the light receiver or the threshold value criterion of a threshold detector can be adjusted.

The control and evaluation unit is preferably configured to adapt the sensitivity inversely to the signal dynamics. The idea here is that the sensor is adapted to a value of the signal dynamics of one, for instance at a maximum range, and the variations of the signal dynamics for other distances are compensated by the inversion. The inversion in an application on the received signal particularly preferably comprises a division if the signal dynamics are standardized in the described manner to the value of one at their minimum. A threshold is correspondingly multiplied, which is likewise an inverse adaptation of the sensitivity, because a higher threshold corresponds to a lower sensitivity. The signal dynamics are effectively leveled both with a correspondingly smoothed digitized received signal and on an adaptation of threshold value criteria and the like. The signal dynamics can, as in all embodiments, practically be present with only a few values as coarser or finer step functions up to a densely sampled function, an interpolating function, or an analytical function.

The control and evaluation unit is preferably configured to transmit a plurality of transmitted light pulses after one another, to scan the corresponding received pulses with at least one threshold, and to accumulate then in a histogram and to determine the time of flight from the histogram. This embodiment therefore works with a multi-pulse method as in EP 2 469 296 B1 mentioned in the introduction. The signal dynamics can be corrected for the contributing individual measurements and/or in the histogram.

The sensor preferably has a front screen through which the light beam exits the sensor into the monitored zone and has a contamination sensor for evaluating the light permeability of the front screen, with the sensitivity being adapted while taking account of the light permeability. In this particularly advantageous embodiment, an impairment of the front screen is, unlike as in the prior art, not generally taken into account by a sensitivity reserve. The actual transmission capability is rather included in the correction of the signal dynamics of the front screen. The safety reserve for contamination is considerably reduced or completely superfluous. A sensor therefore does not become unnecessarily sensitive if the front screen is not yet contaminated at all and under certain circumstances a sensor that is already highly contaminated and would conventionally be shut down can conversely still continue to be operated.

The sensor is preferably configured as a safety sensor, in particular as a safety laser scanner, and has a safety outlet for the output of a safety relevant shutdown signal. A safety sensor or a safety scanner is a safe sensor or a safe laser scanner in the sense of a safety standard such as initially described and can therefore be used for operator protection at hazard sources. The safety outlet, in particular an OSSD (output signal switching device), is accordingly safe, for instance designed with two channels, and serves for the initiation of a safety relevant measure such as an emergency stop or somewhat more generally for the establishing of a safe state.

The control and evaluation unit is preferably configured for a protected field evaluation in which it is determined whether an object is located in at least one configured protected field within the monitored zone, with the sensitivity being adapted in dependence on the configured protected field, in particular using a minimum of the signal dynamics within the configured protected field. The safety evaluation is thus already integrated in the sensor that directly provides a safety relevant shutdown signal for a machine or for an interposed safety control.

A protected field evaluation makes it possible to advantageously correct the signal dynamics in dependence on the configured protected fields. For the sensor also does not have to provide any reliable object detection at distances at which there is no protected field at all. Instead of therefore as before being oriented on the maximum range where the minimum of the sensitivity is located, the distances actually covered by the protected fields are now used and the minimum of sensitivity is used as a reference point. It can in particular be sufficient to only use the boundaries of the protected field since a protected field is necessarily only infringed from the margin and even preferably only the finest protected field boundary since this effectively corresponds to the maximum required range.

The method in accordance with the invention can be further developed in a similar manner and shows similar advantages in so doing. Such advantageous features are described in an exemplary, but not exclusive manner in the subordinate claims dependent on the independent claims.

Figure 2:
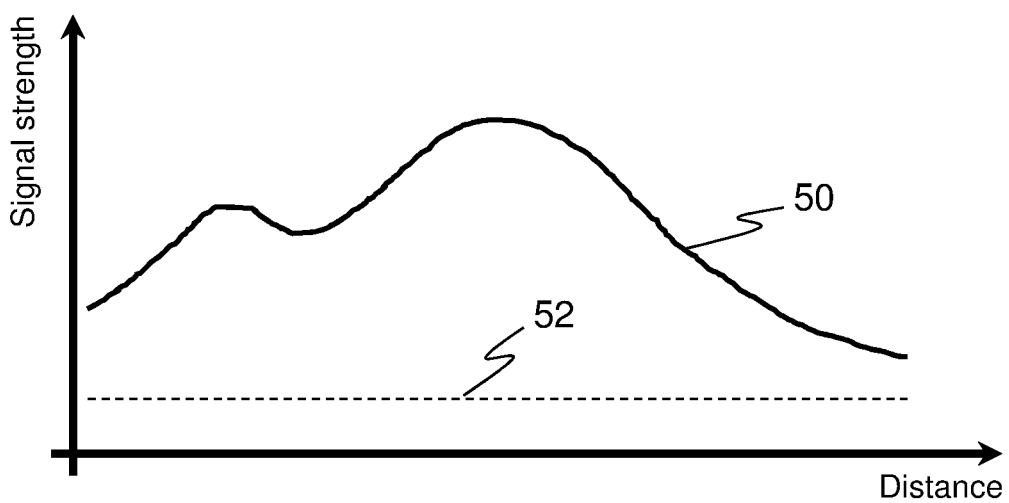
Figure 3:
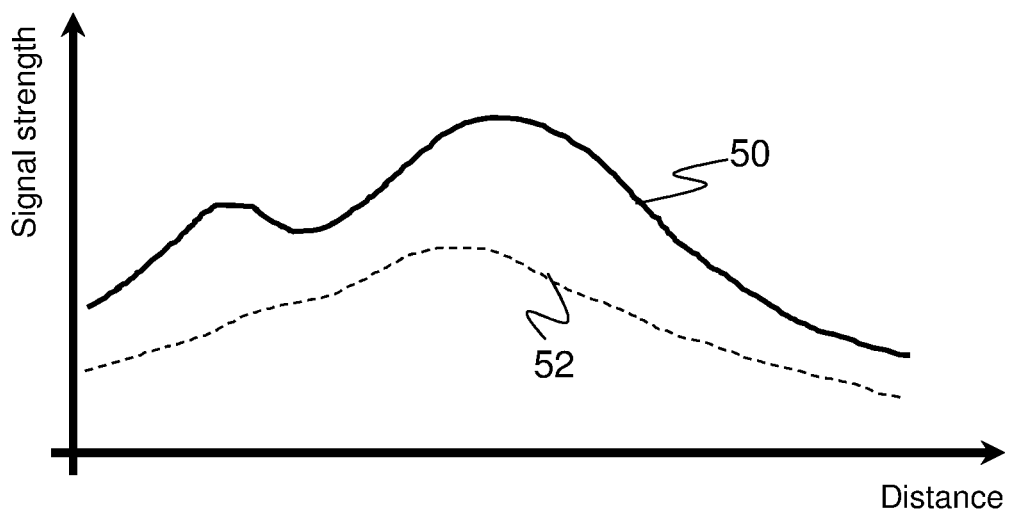
Figure 4:
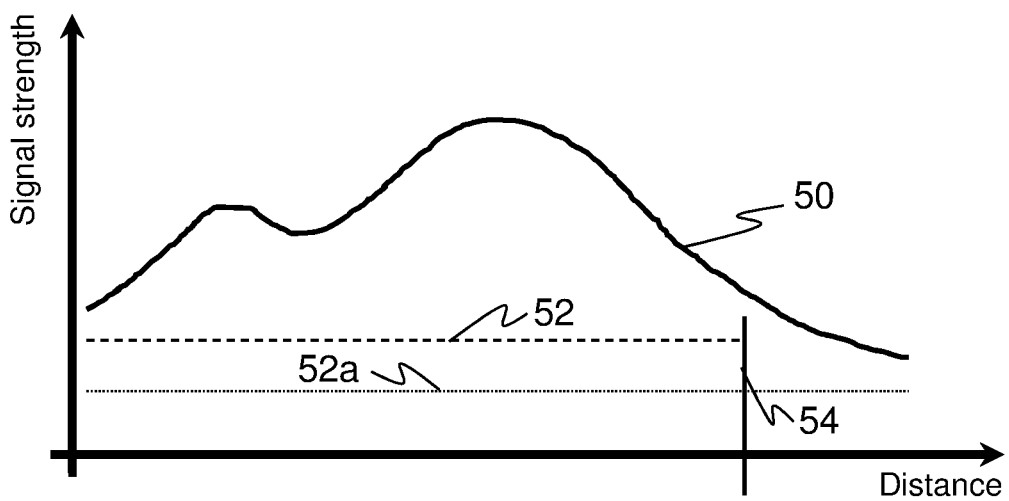
Figure 5:
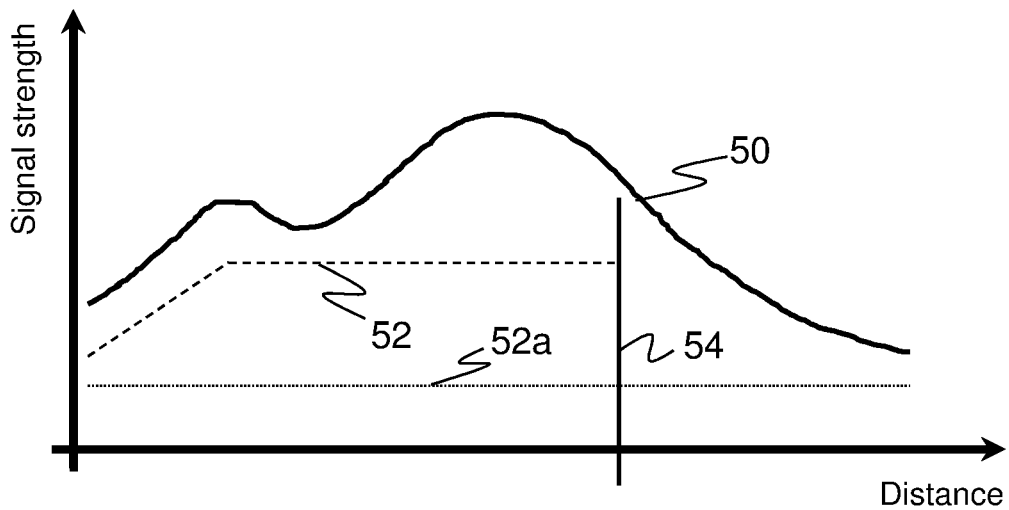

The invention will be explained in more detail in the following also with respect to further features and advantages by way of example with reference to embodiments and to the enclosed drawing. The Figures of the drawing show in:

FIG. 1 a schematic sectional representation of a safety laser scanner;

FIG. 2 an exemplary representation of signal dynamics with a conventional constant threshold;

FIG. 3 an exemplary representation of signal dynamics with a direction-dependent threshold adapted thereto;

FIG. 4 an exemplary representation of signal dynamics with a constant threshold adapted with reference to a maximum protected field extent; and FIG. 5 an exemplary representation of signal dynamics with a threshold increasing in the near zone and adapted with reference to a maximum protected field extent.

FIG. 1 shows a schematic sectional representation through a sensor 10 configured as a safety laser scanner. Safety laser scanner means that a use is possible in operator protection, that is measurements have been taken in accordance with the standards named in the introduction that preclude an unrevealed failure of the function in accordance with the safety level or performance level.

A light transmitter 12, for example having a laser light source, generates, with the aid of a transmission optics 14, a transmitted light beam 16 which is deflected at a deflection unit 18 into a monitored zone 20. If the transmitted light beam 16 is incident on an object in the monitored zone 20, remitted light 22 again moves back to the sensor 10 and is there detected via the deflection unit 18 and by means of a reception optics 24 by a light receiver 26, for example one or more photodiodes, APDs (avalanche photodiodes) or SPADs (single photon avalanche diodes).

The deflection unit 18 is configured in this embodiment as a rotating mirror which rotates continuously by the drive of a motor 28. The respective angular position of the motor 28 or of the deflection unit 18 is recognized via an encoder which, for example, includes a code disk 30 and a forked light barrier 32. The light beam 16 generated by the light transmitter 12 thus sweeps over the monitored zone 20 generated by the rotational movement. Instead of a rotating mirror, it is also possible to configure the deflection unit 18 as a rotating optics head in which the light transmitter 12 and/or the light receiver 26, and possibly further elements, are accommodated.

The design of the transmission optics 14 and reception optics 24 can also be varied, for instance via a beam-shaping mirror as a deflection unit, another arrangement of the lenses or additional lenses. In the embodiment in accordance with FIG. 1, the light transmitter 12 and the light receiver 26 are preferably very close to one another to receive a sufficient received signal in the near zone and are accommodated on a common circuit board 34. This is also only an example since separate circuit boards and other arrangements, for example with more distance or at least a mutual vertical offset, can be provided. Safety laser scanners are also known in a coaxial arrangement, that is with a common optical axis of the light transmitter 12 and the light receiver 26.

If now remitted light 22 is received from the monitored zone 20 by the light receiver 26, a conclusion can be drawn on the angular position of the object in the monitored zone 20 from the angular position of the deflection unit 18 measured by the encoder 30, 32. In addition, the time of flight from the transmission of a light signal up to its reception after reflection at the object in the monitored zone 20 is preferably determined and a conclusion is drawn on the distance of the object from the sensor 10 using the speed of light. A pulse time of flight method is preferably used for this purpose, that is the transmitted light beam 16 is modulated by brief pulses and the time of flight between the transmission and reception of a pulse is determined. Single pulse processes and pulse averaging processes are possible here.

A control and evaluation unit 36 is connected to the light transmitter 12, to the light receiver 26, to the motor 28, and to the encoder 32. It controls the measurement procedure, inter alia modulates the transmitted light beam for this purpose, determines the time of flight, and receives information on the angular position. Two-dimensional polar coordinates of all the objects in the monitored zone 20 are thus available via the angle and the distance. In a safety engineering application, the control and evaluation unit 36 checks whether a non-permitted object intrudes into a protected zone fixed within the monitored zone 20. If this is the case, a safeguarding signal is output via a safety output 38 (OSSD, output signal switching device) to a monitored hazard source, for example to a machine. There can be additional interfaces, not shown, for outputting raw or preprocessed measurement data or, for example, for parameterizing the safety laser sensor 10.

All the named functional components are arranged in a housing 40 which has a front screen 42 in the region of the light exit and of the light entry. Detectors in the manner of light barriers are arranged over the periphery of the front screen 42 to check its transmission capability. In FIG. 1, these detectors each have an only very roughly shown transmitter/receiver pair 44 in the interior of the housing 40 and a reflector 46 outside the housing 40. A test light beam 48 therefore passes through the front screen 42, actually twice in this case, and the level registered in the transmitter/receiver pair 44 decreases in dependence on the degree of contamination of the front screen 42. The control and evaluation unit 36 can therefore evaluate the transmission capability of the front screen 42 with the aid of the transmitter/receiver pairs 44. This is only an example for the contamination measurement for the front screen 42; other arrangements known per se are equally possible.

FIG. 2 shows an exemplary progression of signal dynamics 50 of the sensor 10. The signal dynamics were explained in the introduction and should not be repeated here. Briefly summarized, the signal dynamics are a function of the relative signal strength in dependence on the distance from the sensor 10, They are typically standardized to the value one at the maximum range of the sensor 10. In an intermediate distance zone, a maximum is produced by the quadratic decrease in signal strength as the distance increases, on the one hand, and the migration or only partial incidence of the light spot on the light receiver as the distance decreases, on the other hand. There are additionally higher order effects that here lead to a further maximum, for example by more complex images of the reception optics 24 that can in particular have different distance zones.

The signal dynamics 50 can be measured for a specific sensor 10, either during the optics development, during the manufacture, or in a calibration or teaching process at the operating site in that an object is presented at different distances under otherwise unchanged circumstances. Alternatively or additionally, it is theoretically determined from simulations or optical considerations. The progression of the signal dynamics is at least known for the following observations, with an approximation being sufficient by knowledge only for some distance values. In this respect, the signal dynamics 50 can themselves be stored in the control and evaluation unit 36 or only the values and procedures determined therefrom are stored there.

Conventionally, a laser scanner works with a constant threshold 52 that is oriented on the maximum range because the sensitivity is the lowest there, that is the signal dynamics adopt their minimum. However, this means that an object detection at a distance that corresponds to the maximum of the signal dynamics 50 is detected with a multiple of the required sensitivity. Even small disturbances such as raindrops, dust, or insects can thereby be detected as objects.

FIG. 3 again shows the progression of the signal dynamics 50, but now together with a distance-dependent progression of the threshold 52 adapted in accordance with an embodiment of the invention. The signal dynamics 50 are thus taken into account on the setting of the sensitivity. The threshold 52 is now a function of the distance. The threshold 52 preferably at least roughly follows the progression of the signal dynamics 50. The correlation can, however, have different characteristics. The smaller secondary maximum of the signal dynamics 50 is thus, for example, largely ignored by the threshold 52. The coincidence in the progression of the signal dynamics 50 and of the threshold 52 can be stronger or weaker. A step-like extent of the threshold 52 is in particular conceivable with also only a few adapted values, for example for small distances, in the region of the maximum of the signal dynamics 50, and for large distances.

There are different possibilities how the control and evaluation unit 26 applies the distance-dependent threshold 52. In an embodiment, the distance from an object is measured. The measured signal strength is subsequently compared with the minimal signal strength for this distance, with the minimal signal strength being derived from the signal dynamics 50. This corresponds to a threshold comparison with the distance-dependent threshold 52 at the measured distance. If the measured signal strength does not reach the required signal strength, the measurement is considered as invalid or is discarded. It is therefore no longer the case that the sensor 10 measures more sensitively in the range of higher signal dynamics 50, particularly at their maximum. Interference effects are thereby effectively suppressed.

It is not absolutely necessary that a distance measurement value is available to read the matching value of the signal dynamics 50 or of the threshold 52 with respect to this distance. The measurement can first also be replaced with different prior knowledge, for instance an early distance value or a configured region of interest. The latter will be explained in more detail below with reference to FIGS. 4 and 5. In a further embodiment, a fast adaptation to the time scales of the time of flight takes place. The threshold 52 is continuously adapted by the transmission of a transmitted light pulse. Whenever an object is actually scanned, the threshold 52 is then so-to-say actually set to the matching distance as a precaution. A threshold 52 can then actually be implemented via an analog threshold detector that is adapted correspondingly dynamically.

Alternatively, the threshold 52 is only applied in the control and evaluation unit 36 after digiting the received signal. A compensation of the digitized received signal with the signal dynamics 50 has practically the same effect. A received signal is then present as if the signal dynamics 50 were flat and the threshold 52 can then consequently also be constant again. This is effectively still a distance-dependent threshold 52.

In addition to a threshold 52, there are different alternative or supplementary possibilities for an adaptation of the sensitivity of the sensor 10 in accordance with the signal dynamics 50 that can be used individually or in combination. Instead of smoothing the received signal subsequently with the signal dynamics 50, a corresponding gain adaptation can also take place during its recording. The gain in the reception path can already be changed at the light receiver 26 itself, for instance a bias of an APR, or via the gain factor of an amplifier arranged downstream. It is furthermore conceivable to increase the optical output power of the light transmitter 12. It should be observed here that a higher laser power does not result in a deviation from the qualified laser protection class.

The setting of the sensitivity can thus take place in the most varied manners such as very fast within a measurement or slower subsequently or between two measurements and by an adaptation solely on the software side and/or by adapting components of the reception path.

FIG. 4 again shows the signal dynamics 50 now in connection with a threshold 52 that takes account of a region of interest, in particular the respectively configured or programmed protected fields. The maximum range of the sensor 10 is frequently not used at all in the specific application. A finest boundary 54 of a protected field is drawn in FIG. 4 that is considerably in front of the maximum range.

Under these conditions, the sensitivity adaptation can even take place via a constant threshold 52 that is, however, higher than with a conventional design of a non-adapted threshold 52a with reference to the maximum range. The threshold 52 is adapted to the signal dynamics 50 at the distance of the finest boundary 54. A constant threshold 52 or somewhat more generally a global lowering of the sensitivity is particularly simple to implement and to apply. Safety remains ensured, with it having to be noted that a protected field is always infringed from the margin. The setting of the sensitivity can be carried out automatically subsequent to the protected field configuration. All the said variants are available for this, including an adaptation of the threshold 52 at the software side or hardware side, a change of the gain in the reception path, and a reduction of the output power of the light transmitter 12.

A constant threshold 52 in adaptation to the signal dynamics 50 at the most distant boundary 54 is particularly advantageous and simple. The adaptation can be oriented somewhat more generally not on the finest boundary 54, but rather on the minimum of the signal dynamics 50 for all the distances of a region of interest or of a protected field, with the minimum often being determined solely by the most distant boundary 54, otherwise as a rule by the next and most distant boundary. In addition, the threshold 52 also does not have to be constant here, but is adapted to the signal dynamics 50 as above, but in a limited manner to the distances covered by the protected fields.

FIG. 5 is a representation similar to FIG. 4, but with now the finest boundary 54 being in a region of the signal dynamics 50 where it adopts larger values than in the near zone. An adaptation solely to the signal dynamics 50 at the finest boundary 54 would therefore not be sufficient since now the sensitivity in the near zone is the smallest, no longer that at the finest boundary 54. This can be taken into account in that the threshold 52 is adapted as a whole to the value at the shortest relevant distance. Instead in FIG. 5, no constant threshold 52 is selected in the near zone, but rather an increasing threshold 52. The behavior of the threshold 52 shown increasing linearly with a distance-dependent factor can be handled particularly simply, but is not to be understood as restrictive. The threshold 52 can follow the signal dynamics 50 in the near zone or in total or more roughly or finely in a different manner.

A further aspect not shown in the Figures is the inclusion of the transmission measurement of the front screen 42 with the aid of the transmitter/receiver pairs 44. The sensor 10 may no longer be operated when the front screen 42 is contaminated too heavily and then permanently switches into the safeguarding state. A sensitivity reserve of, for example, 30% is conventionally kept back so that this does not take place too fast. In a further embodiment of the invention, instead of this sensitivity reserve, the respective adapted sensitivity takes account of the result of the transmission measurement.

As long as the front screen 42 is therefore clean, there is preferably no sensitivity reserve. As contamination increases, the sensitivity is no longer lowered so much in accordance with the adaptation to the signal dynamics 50 or the threshold 52 is no longer increased so much to compensate the light losses at the front screen 42. The transmitter/receiver pairs 44 anyway deliver the required information on the degree to which this is necessary. This cannot be safety critical because the sensitivity is only increased with respect to the starting state.

The invention claimed is:

1. An optoelectronic sensor for detecting an object in a monitored zone, the optoelectronic sensor comprising:
   a light transmitter for transmitting a light beam into the monitored zone;
   a light receiver for generating a received signal from the light beam remitted by the object;
   a moving deflection unit for a periodic deflection of the light beam to scan the monitored zone in the course of the movement; and
   a control and evaluation unit that is configured to determine the time of flight between the transmission and reception of the light beam and to determine the distance from the object therefrom, wherein the optoelectronic sensor has a correction of the signal dynamics, and wherein the control and evaluation unit is configured to correct the signal dynamics by adapting the sensitivity of the optoelectronic sensor, the signal dynamics representing relative reception power of the optoelectronic sensor and the correction thereof being dependent on the determined distance between the optoelectronic sensor and the object, the correction of the signal dynamics being determined by a comparison between the signal dynamics and a pre-stored set of distance dependent signal dynamics values, wherein the control and evaluation is further configured to detect the object by an evaluation of the received signal with a threshold value, the threshold value being adapted in a distance-dependent manner using the signal dynamics.

2. The optoelectronic sensor in accordance with claim 1, wherein the optoelectronic sensor is a laser scanner.

3. The optoelectronic sensor in accordance with claim 1, wherein the correction of the signal dynamics comprises a correction of the relative reception power in dependence on the distance of the scanned object.

4. The optoelectronic sensor in accordance with claim 1, wherein the control and evaluation unit is configured to digitize the received signal and to correct it using the signal dynamics.

5. The optoelectronic sensor in accordance with claim 1, wherein the control and evaluation is configured to carry out the adaptation of the sensitivity by adaptations of the evaluation.

6. The optoelectronic sensor in accordance with claim 1, wherein the control and evaluation unit is configured to adapt components in the reception path of the light receiver for the adaptation of the sensitivity between two measurements and/or within one measurement.

7. The optoelectronic sensor in accordance with claim 6, wherein the control and evaluation unit is configured to adapt the sensitivity of at least one of the light receiver, an amplifier arranged downstream of the light receiver, and a threshold detector arranged downstream of the light receiver.

8. The optoelectronic sensor in accordance with claim 1, wherein the control and evaluation unit is configured to adapt the sensitivity inversely to the signal dynamics.

9. The optoelectronic sensor in accordance with claim 1, wherein the control and evaluation unit is configured to transmit a plurality of transmitted light pulses after one another, to scan the corresponding received pulses with at least one threshold, and to accumulate them in a histogram and to determine the time of flight from the histogram.

10. The optoelectronic sensor in accordance with claim 1, further comprising:

a front screen through which the light beam exits the optoelectronic sensor into the monitored zone and has a contamination sensor for evaluating the light permeability of the front screen, and wherein the sensitivity is adapted while taking account of the light permeability.

11. The optoelectronic sensor in accordance with claim 1, wherein the optoelectronic sensor is configured as a safety sensor and has a safety outlet for the output of a safety relevant shutdown signal.

12. The optoelectronic sensor in accordance with claim 11, wherein the safety sensor is a safety laser scanner.

13. The optoelectronic sensor in accordance with claim 11, wherein the control and evaluation unit is configured for a protected field evaluation in which it is determined whether an object is located in at least one configured protected field within the monitored zone, and wherein the sensitivity is adapted in dependence on the configured protected field.

14. The optoelectronic sensor in accordance with claim 13, wherein the sensitivity is adapted in dependence on the configured protected field using a minimum of the signal dynamics within the configured protected field.

15. A method of detecting an object in a monitored zone, comprising the steps of:

transmitting a light beam into the monitored zone with a light transmitter of an optoelectronic sensor;

receiving the light beam after the light beam is remitted at the object with a light receiver of the optoelectronic sensor;

periodically deflecting the light beam by a moving deflection unit to scan the monitored zone in the course of the movement;

determining a time of flight between the transmission and the reception of the light beam;

determining a distance from the object from the time of flight; and correcting signal dynamics by adapting sensitivity, wherein the signal dynamics represent a relative reception power of the optoelectronic sensor and the step of correcting the signal dynamics is dependent on the determined distance between the optoelectronic sensor and the object, the correction of the signal dynamics being determined by a comparison between the signal dynamics and a pre-stored set of distance dependent signal dynamics values, and wherein the object is detected by an evaluation of a received signal with a threshold value, the threshold value being adapted in a distance-dependent manner using the signal dynamics, wherein the received signal is generated by the light receiver.

16. The method of detecting an object in a monitored zone in accordance with claim 15, wherein the step of correcting the signal dynamics comprises correcting the relative reception power in dependence on the distance of the object.

17. The method of detecting an object in a monitored zone in accordance with claim 15, wherein the adapting of the sensitivity is performed inversely to the signal dynamics.

* * * * *